United States Patent
Babu et al.

(10) Patent No.: US 12,496,160 B2
(45) Date of Patent: Dec. 16, 2025

(54) ANOMALY DETECTION IN INSTRUMENTS IN A SURGICAL ROBOTIC SYSTEM

(71) Applicant: Auris Health, Inc., Redwood City, CA (US)

(72) Inventors: Sree Shankar Satheesh Babu, Redwood City, CA (US); Alireza Hariri, Redwood City, CA (US)

(73) Assignee: Auris Health, Inc., Santa Clara, CA (US)

( * ) Notice: Subject to any disclaimer, the term of this patent is extended or adjusted under 35 U.S.C. 154(b) by 555 days.

(21) Appl. No.: 17/944,273

(22) Filed: Sep. 14, 2022

(65) Prior Publication Data

US 2024/0081938 A1    Mar. 14, 2024

(51) Int. Cl.
| | | |
|---|---|---|
| *A61B 90/00* | (2016.01) | |
| *A61B 34/00* | (2016.01) | |
| *A61B 34/20* | (2016.01) | |
| *A61B 34/35* | (2016.01) | |

(52) U.S. Cl.
CPC .............. *A61B 90/06* (2016.02); *A61B 34/20* (2016.02); *A61B 34/35* (2016.02); *A61B 34/71* (2016.02); *A61B 2034/2059* (2016.02); *A61B 2090/066* (2016.02)

(58) Field of Classification Search
CPC ......... A61B 90/06; A61B 34/20; A61B 34/35; A61B 34/71; A61B 2034/2059; A61B 2090/066
USPC .......................................................... 702/34
See application file for complete search history.

(56) References Cited

U.S. PATENT DOCUMENTS

| | | | |
|---|---|---|---|
| 10,166,082 B1 * | 1/2019 | Hariri | A61B 34/71 |
| 11,389,248 B1 * | 7/2022 | Roh | G05B 13/0265 |
| 11,426,243 B2 | 8/2022 | Beck | |
| 2016/0364526 A1 | 12/2016 | Reicher et al. | |
| 2019/0274716 A1 * | 9/2019 | Nott | A61B 17/295 |
| 2020/0000471 A1 * | 1/2020 | Shelton, IV | A61B 17/072 |
| 2021/0282876 A1 | 9/2021 | Ergueta Tejerina et al. | |
| 2021/0298857 A1 | 9/2021 | Zheng et al. | |
| 2022/0378523 A1 * | 12/2022 | Tobergte | G16H 40/40 |
| 2023/0024362 A1 * | 1/2023 | Meglan | A61B 90/37 |

FOREIGN PATENT DOCUMENTS

| | | | | |
|---|---|---|---|---|
| CN | 102353493 B | * | 6/2013 | |
| WO | 2021071784 A1 | | 4/2021 | |
| WO | WO-2021118733 A1 | * | 6/2021 | ............. A61B 34/20 |
| WO | WO-2024057170 A1 | * | 3/2024 | ............. A61B 34/20 |

OTHER PUBLICATIONS

English translation of CN 102353493, Jun. 19, 2013. (Year: 2013).*
Preliminary Report on Patentability for International App. PCT/IB2023/058979 mailed Mar. 27, 2025.

* cited by examiner

*Primary Examiner* — Michael P Nghiem
(74) *Attorney, Agent, or Firm* — Lempia Summerfield Katz LLC

(57) ABSTRACT

A machine-learned model is used in the detection of anomalies in operation of the instrument drive chain of a surgical robotic system. For example, normal operation (e.g., cable force) based on operation information (e.g., position and/or load) is predicted by the machine-learned model, which prediction is then compared to actual operation. The comparison results in early detection of anomalies based on machine-learned prediction and the corresponding incorporation of historical operation.

12 Claims, 8 Drawing Sheets

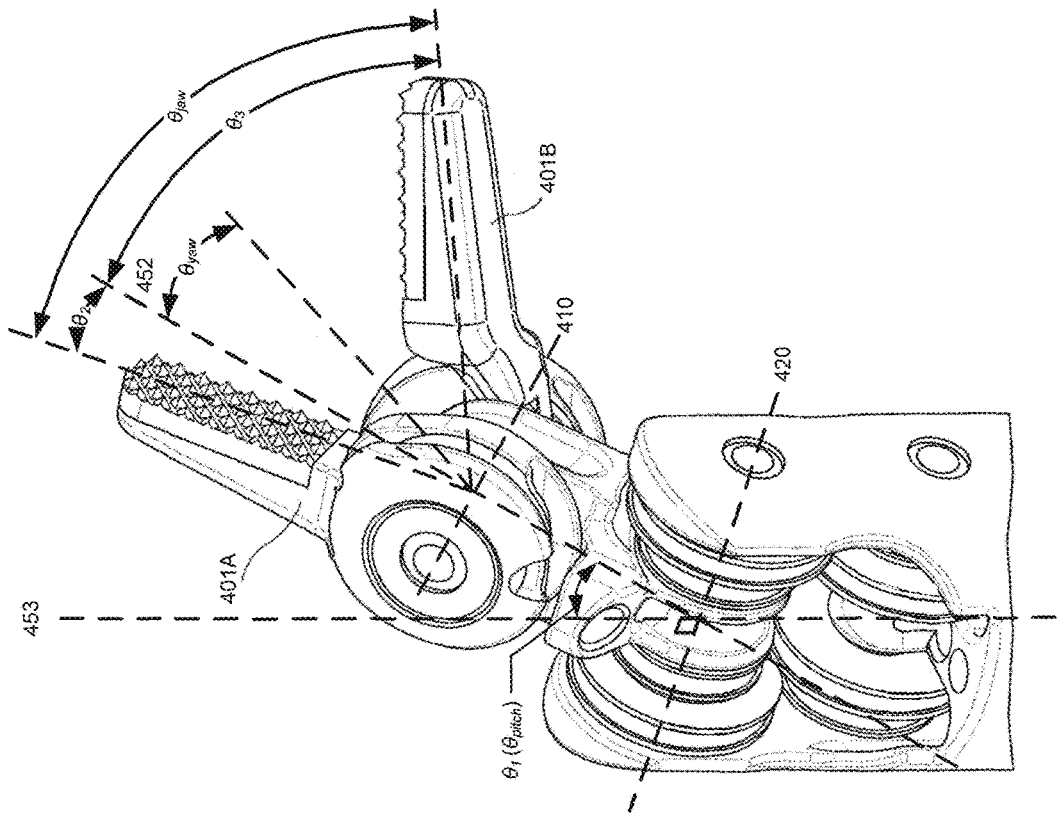
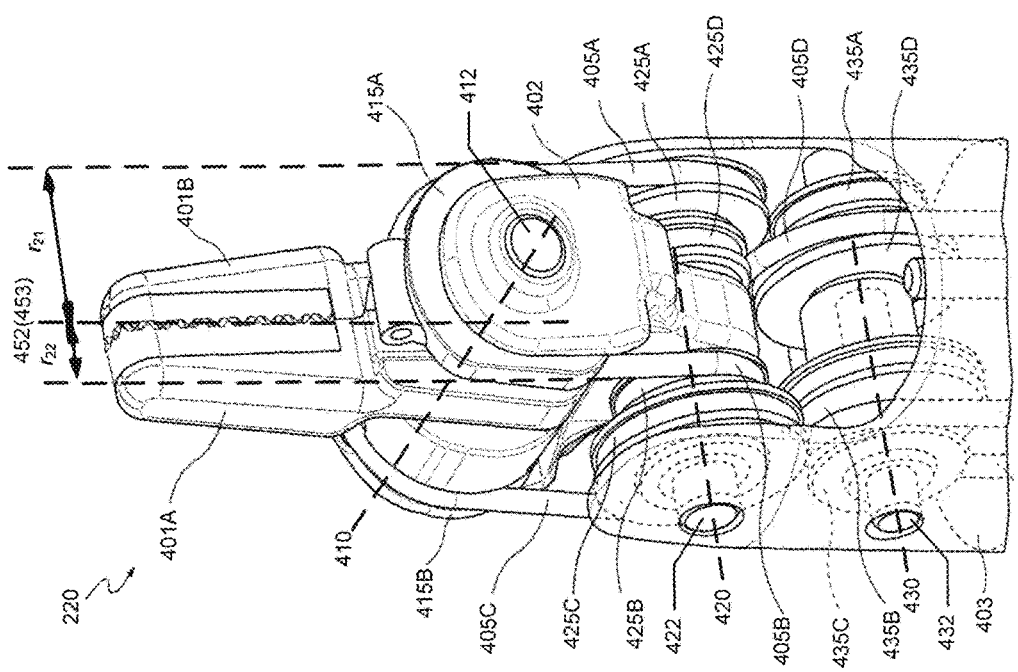
FIG. 4A
FIG. 4B

ANOMALY DETECTION IN INSTRUMENTS IN A SURGICAL ROBOTIC SYSTEM

FIELD

Embodiments relate to detection of an anomaly in instruments used in tele-operation by a surgical robotic system.

BACKGROUND

Minimally-invasive surgery (MIS), such as laparoscopic surgery, involves techniques intended to reduce tissue damage during a surgical procedure. MIS may be performed with robotic systems that include one or more robotic arms for manipulating surgical tools based on commands from a remote operator. In robotic MIS systems, it may be desirable to establish and maintain high positional accuracy for surgical instruments supported by the robotic arms.

Surgical instruments for the robotic arms may share similar designs, for example, a tool may have an end effector including a robotic wrist and one or more jaws. The end effectors may include tools for grasping, cutting, suturing, among other surgical tasks. A cable system couples the end effector to actuators in a tool drive, which can drive multi-axial motions (e.g., pitch and yaw) of the end effector. For example, four actuators using four cables drive an end effector with a robotic wrist with a pair of jaws.

Anomalies may occur, such as due to wear of the surgical instrument or drive train or due to interference. Unexpected forces can arise due to factors such as presence of debris, increase in friction due to cable fraying, unexpected external side loads, etc. Such events can lead to instrument cables snapping or impede tool tip motion and adversely affect the surgeon's capability to perform procedures. Earlier reaction or replacement to avoid problems when using with a patient is desired.

SUMMARY

By way of introduction, the preferred embodiments described below include methods, systems, instructions, and computer readable media for anomaly detection in an instrument of a surgical system. A machine-learned model is used in the detection of anomalies in operation of the instrument drive chain. For example, normal operation (e.g., cable force) based on operation information (e.g., position and/or load) is predicted by the machine-learned model, which prediction is then compared to actual operation. The comparison results in early detection of anomalies based on machine-learned prediction and the corresponding incorporation of historical operation.

In a first aspect, a method is provided for anomaly detection in an instrument of a surgical system. Measurements are received from a sensor. The sensor senses at a drive chain of the instrument. During use of the instrument, a first operation of the drive chain is predicted by a machine-learned model in response to input of the measurements. The anomaly is detected based on comparison of the predicted first operation output by the machine-learned model and an actual operation of the drive chain. An indication of detection of the anomaly is output.

In a second aspect, a surgical robotic system is provided for anomaly detection. A surgical tool connects by a first number of cables to a respective number of actuators. The surgical tool connects such that actuation of the actuators moves the surgical tool. First sensors are configured to sense positions of the actuators. A processor is configured to detect the anomaly by application of a machine-learned network. The machine-learned network is configured to receive the positions and output a predicted cable force.

In a third aspect, a surgical robotic system is provided for anomaly detection. A robotic arm is configured to hold and operate a surgical tool. A processor is configured to detect the anomaly by application of a machine-learned model. The machine-learned model is configured to receive past operation information and output a predicted operation.

The present invention is defined by the following claims, and nothing in this section should be taken as a limitation on those claims. Further aspects and advantages of the invention are discussed below in conjunction with the preferred embodiments and may be later claimed independently or in combination.

BRIEF DESCRIPTION OF THE DRAWINGS

The embodiments of the invention are illustrated by way of example and not by way of limitation in the figures of the accompanying drawings in which like references indicate similar elements. It should be noted that references to "an" or "one" embodiment of the invention in this disclosure are not necessarily to the same embodiment, and they mean at least one. Also, in the interest of conciseness and reducing the total number of figures, a given figure may be used to illustrate the features of more than one embodiment of the invention, and not all elements in the figure may be required for a given embodiment.

FIGS. 4A and 4B are schematic diagrams illustrating the end effector of an exemplary grasper having a robotic wrist, a pair of opposing jaws, and a pulley and cable system for coupling the robotic wrist and the pair of jaws to the actuators of a tool drive, in accordance with aspects of the subject technology;

DETAILED DESCRIPTION

A machine-learned model is used in prediction of unexpected drive chain operation for a surgical instrument. For example, unexpected cable forces in cables of cable-driven tools are detected during tele-operation. The anomaly detection framework is used to predict cable forces based on past trends, and this prediction informs the user of an impending failure. As another example, prediction is used as a proxy for an expected value for given encoder and/or load sensor. The model is machine trained to learn the dynamics between changes in (a) encoder position and/or load and (b) evolution of torque distribution in articulation cables.

Based on the prediction, corrective actions may be taken before failure. Corrective actions could include driving the surgical instrument less aggressively to complete the current task or replacing and/or repositioning the surgical instrument once a warning has been issued.

The proposed framework is more robust in detecting anomalies as opposed to other model-based techniques. By machine training, the training data may be obtained from actual operation of the instrument and can account for unmodeled effects like pose dependent friction, cable stretch, and hysteresis. Furthermore, the inclusion of data from multiple tools result in the machine-learned model being capable of generalizing across multiple tools.

The discussion below first introduces an example robotic surgery system (see FIGS. 1-4B). FIGS. 5-8 show embodiments for anomaly detection using the example or another robotic surgery system. FIG. 9 shows a method for anomaly detection. The embodiments of FIGS. 5-9 use application of a machine-learned model for more rapid and/or accurate anomaly detection.

Figure 9:
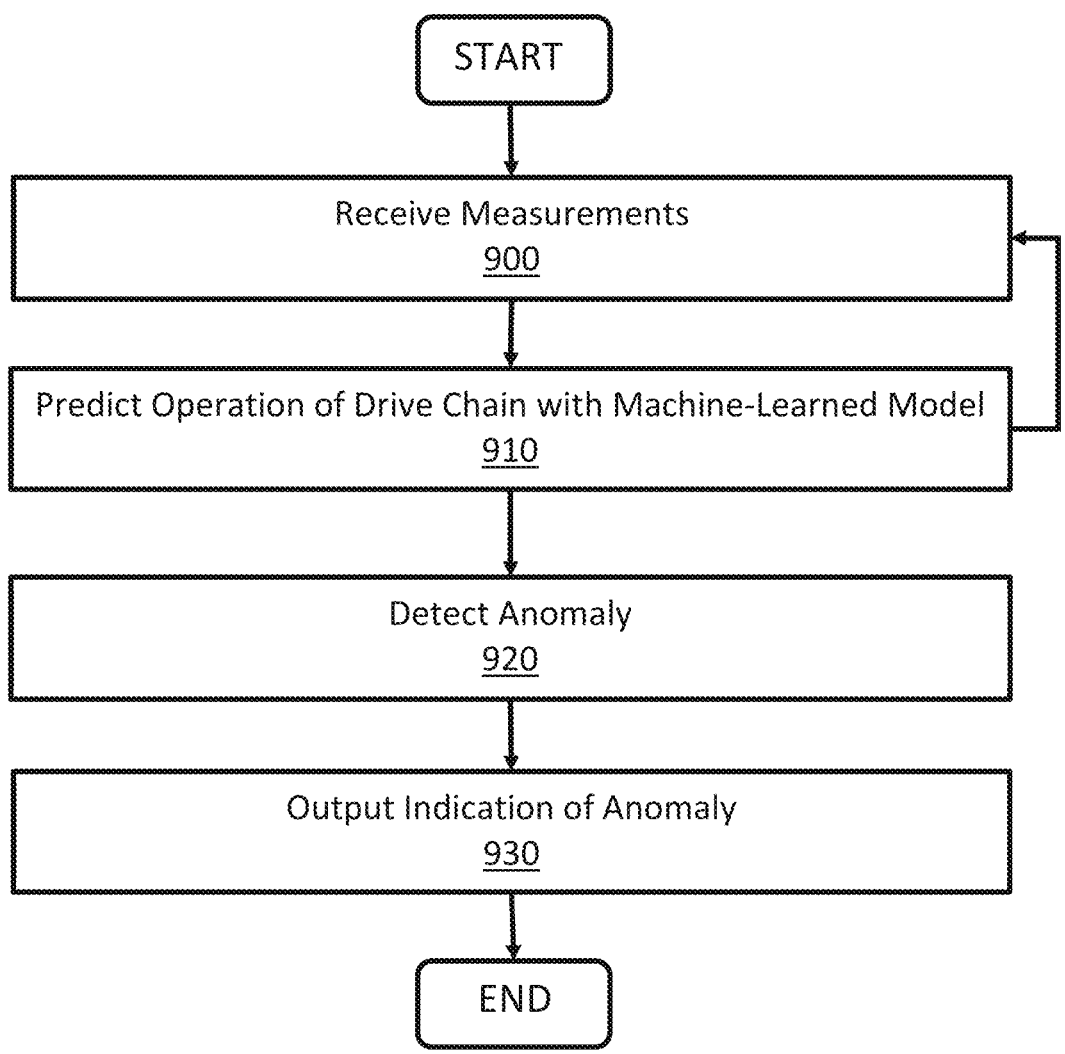
FIG. 9 is a flow chart diagram and corresponding logic for a method of machine-learned network-based detection of anomalies in driving a surgical instrument, according to one embodiment.
Figure 10:
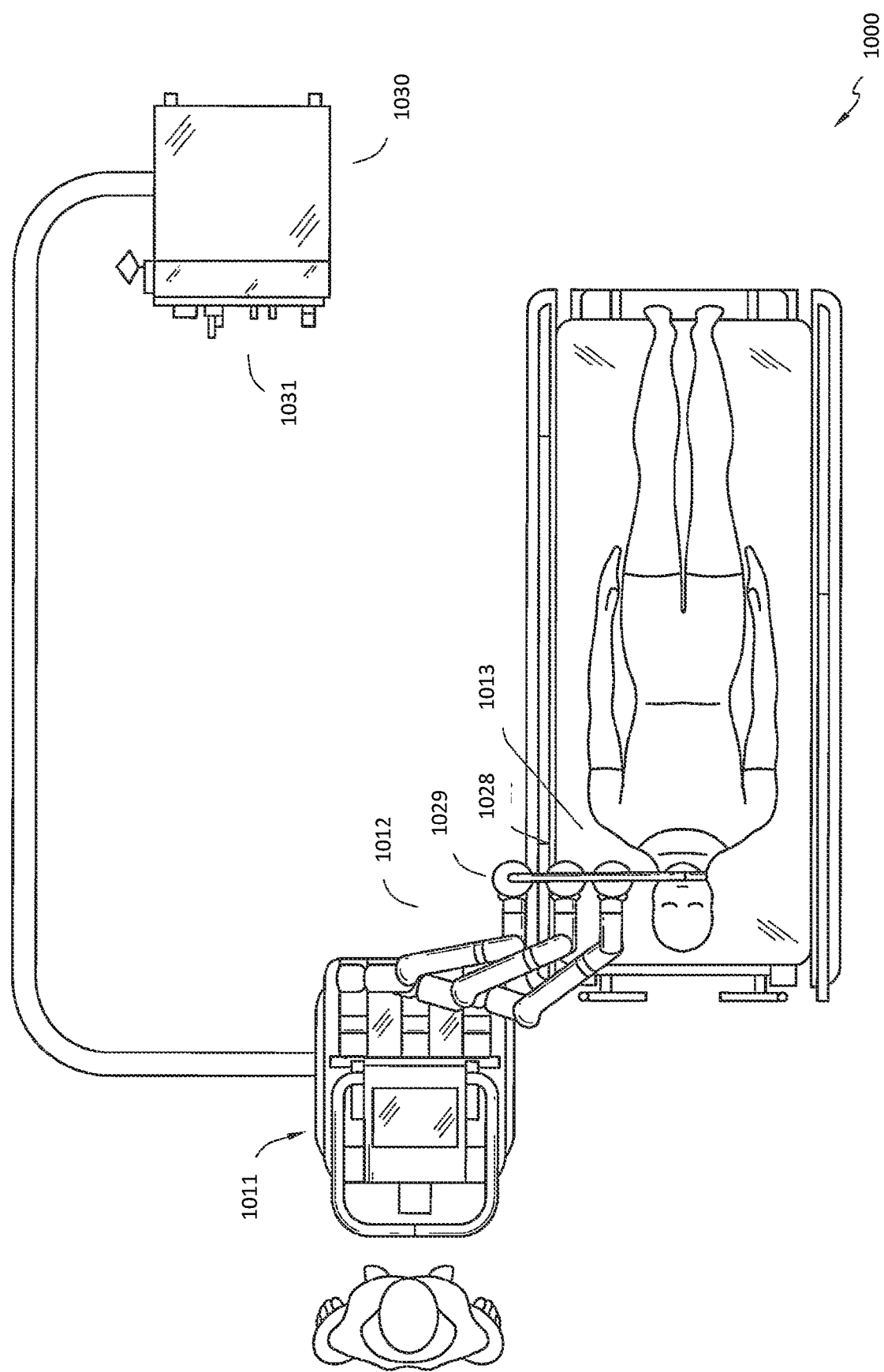
FIG. 10 illustrates an embodiment of a cart-based robotic system arranged for diagnostic and/or therapeutic use (e.g., bronchoscopy)
Figure 11:
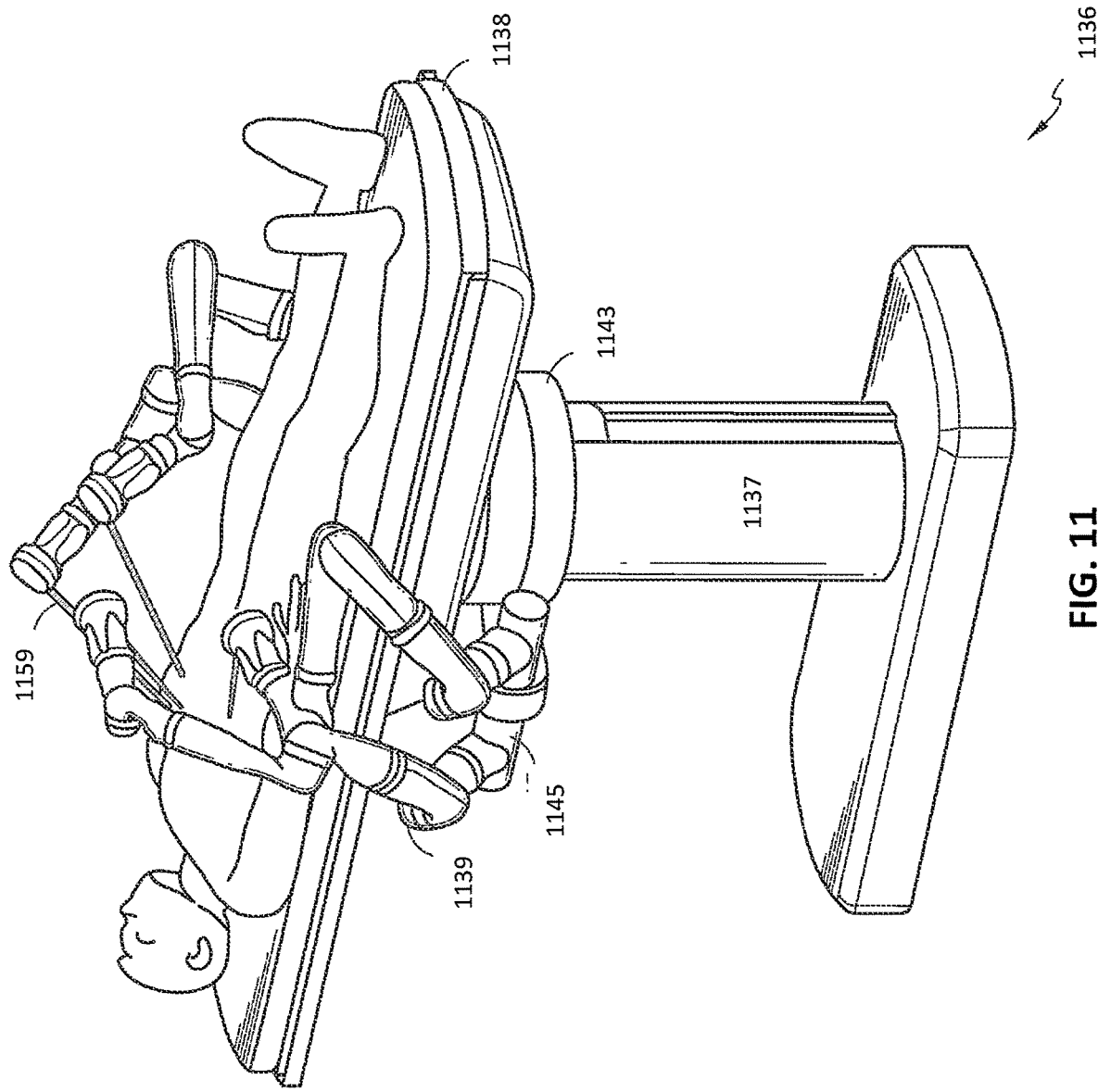
FIG. 11 illustrates an embodiment of a table-based robotic system configured for a procedure (e.g., laparoscopic).

FIGS. 1-4B illustrate one example of a cable-driven robotic surgical instrument and the robotic surgery system for using the instrument. FIGS. 10 and 11 illustrate other examples of robotic surgier systems. Any of these or other examples are used in the anomaly detection systems of FIGS. 5 and/or 6 and/or used in the anomaly detection method of FIG. 9. The descriptions of FIGS. 5, 6, and 9 may use the example of FIGS. 1-4B, but the examples of FIG. 10 or 11 may be used instead. Other cable-driven surgical instruments, robotic arms, and/or robotic surgery systems may be used.

In general, an end effector including a robotic wrist and/or one or more jaws may be coupled to actuators through metal cable or wires. The wires may work, for example, in wire pairs where pulling on one wire imparts an opposite force on the other wire of the wire pair, as such the robotic wrist may be an antagonistic robotic wrist. Jaws are used in this example, but other applied surgical robotic instruments may be used. Applied surgical robotic instruments include graspers, forceps, scissors, needle drivers, retractors, pliers, and cautery instruments, among others.

Figure 1:
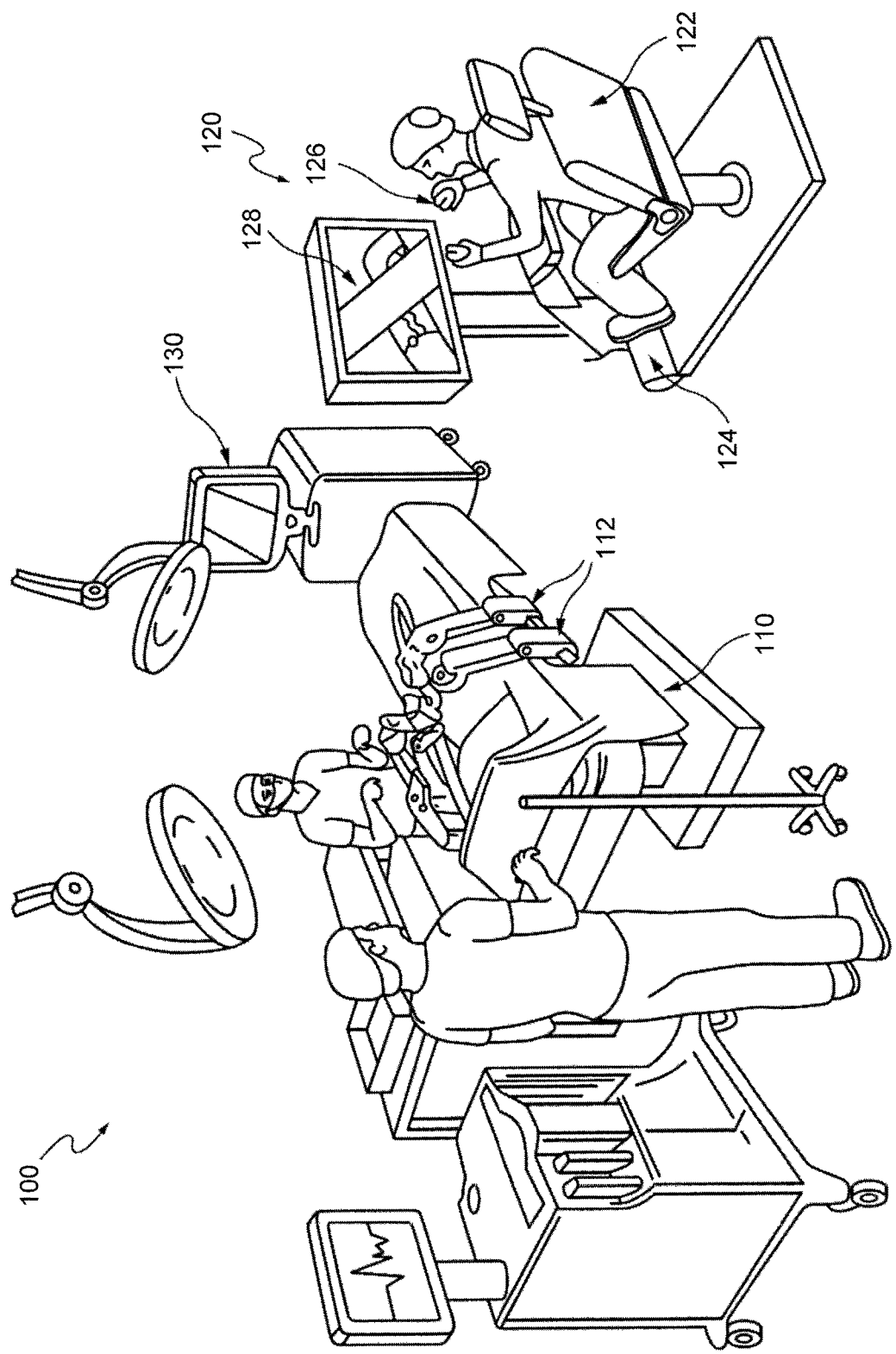
FIG. 1 is a diagram illustrating an example operating room environment with a surgical robotic system, in accordance with aspects of the subject technology.

FIG. 1 is a diagram illustrating an example operating room environment with a surgical robotic system 100, in accordance with aspects of the subject technology. As shown in FIG. 1, the surgical robotic system 100 has a surgeon console 120, a control tower 130, and one or more surgical robotic arms 112 located at a surgical robotic platform 110 (e.g., a table or a bed etc.), where surgical tools with end effectors are attached to the distal ends of the robotic arms 112 for executing a surgical procedure. The robotic arms 112 are shown as a table-mounted system, but in other configurations, the robotic arms may be mounted in a cart, ceiling or sidewall, or other suitable support surface.

Generally, a user, such as a surgeon or other operator, may use the user console 120 to remotely manipulate the robotic arms 112 and/or surgical instruments (e.g., tele-operation). The user console 120 may be located in the same operation room as the robotic system 100, as shown in FIG. 1. In other environments, the user console 120 may be located in an adjacent or nearby room, or tele-operated from a remote location in a different building, city, or country. The user console 120 may have a seat 122, foot-operated controls 124, one or more handheld user interface devices 126, and at least one user display 128 configured to display, for example, a view of the surgical site inside a patient. As shown in the exemplary user console 120, a surgeon located in the seat 122 and viewing the user display 128 may manipulate the foot-operated controls 124 and/or handheld user interface devices 126 to remotely control the robotic arms 112 and/or surgical instruments mounted to the distal ends of the arms.

In some variations, a user may also operate the surgical robotic system 100 in an "over the bed" (OTB) mode, in which the user is at the patient's side and simultaneously manipulating a robotically-driven tool/end effector attached thereto (e.g., with a handheld user interface device 126 held in one hand) and a manual laparoscopic tool. For example, the user's left hand may be manipulating a handheld user interface device 126 to control a robotic surgical component, while the user's right hand may be manipulating a manual laparoscopic tool. Thus, in these variations, the user may perform both robotic-assisted MIS and manual laparoscopic surgery on a patient.

During an exemplary procedure or surgery, the patient is prepped and draped in a sterile fashion to achieve anesthesia. Initial access to the surgical site may be performed manually with the robotic system 100 in a stowed configuration or withdrawn configuration to facilitate access to the surgical site. Once the access is completed, initial positioning and/or preparation of the robotic system may be performed. During the procedure, a surgeon in the user console 120 may utilize the foot-operated controls 124 and/or user interface devices 126 to manipulate various end effectors and/or imaging systems to perform the surgery. Manual assistance may also be provided at the procedure table by sterile-gowned personnel, who may perform tasks including but not limited to, retracting tissues or performing manual repositioning or tool exchange involving one or more robotic arms 112. Non-sterile personnel may also be present to assist the surgeon at the user console 120. When the procedure or surgery is completed, the robotic system 100 and/or user console 120 may be configured or set in a state to facilitate one or more post-operative procedures, including but not limited to, robotic system 100 cleaning and/or sterilization, and/or healthcare record entry or printout, whether electronic or hard copy, such as via the user console 120.

In some aspects, the communication between the robotic platform 110 and the user console 120 may be through the control tower 130, which may translate user commands from the user console 120 to robotic control commands and transmit to the robotic platform 110. The control tower 130 may also transmit status and feedback from the robotic platform 110 back to the user console 120. The connections between the robotic platform 110, the user console 120 and the control tower 130 may be via wired and/or wireless connections and may be proprietary and/or performed using any of a variety of data communication protocols. Any wired connections may be optionally built into the floor and/or walls or ceiling of the operating room. The surgical robotic system 100 may provide video output to one or more displays, including displays within the operating room as well as remote displays accessible via the Internet or other networks. The video output or feed may also be encrypted to ensure privacy and all or portions of the video output may be saved to a server or electronic healthcare record system.

Figure 2:
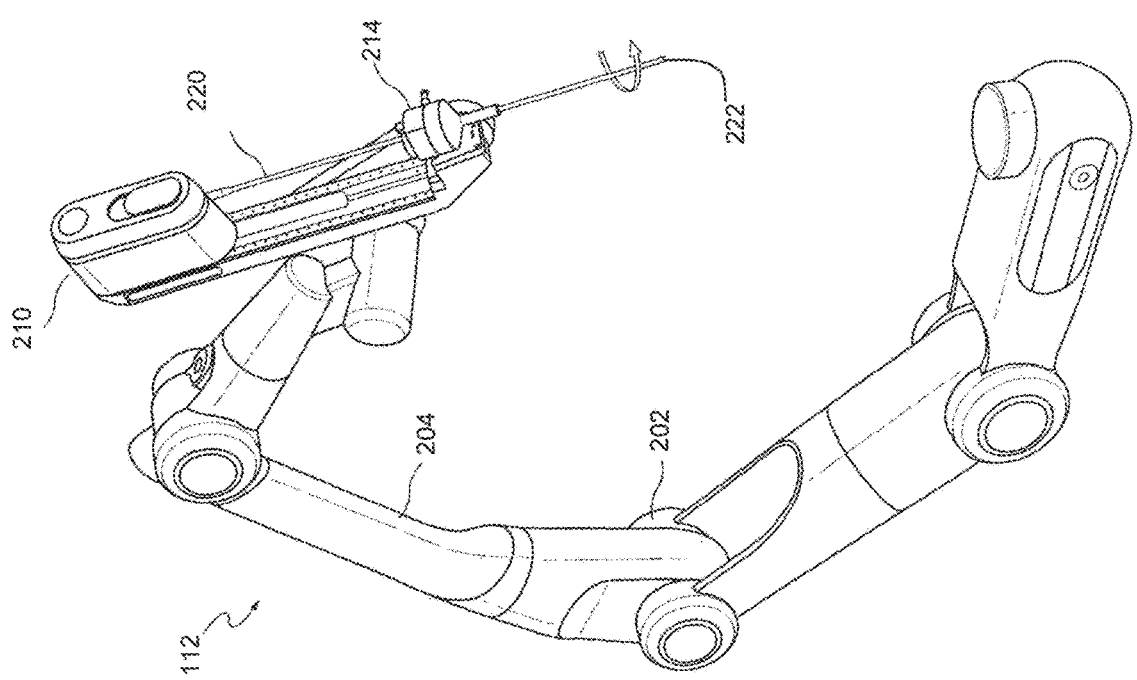
FIG. 2 is a schematic diagram illustrating one exemplary design of a robotic arm, a tool drive, and a cannula loaded with a robotic surgical tool, in accordance with aspects of the subject technology.

FIG. 2 is a schematic diagram illustrating one exemplary design of a robotic arm 112, a tool drive, and a cannula loaded with a robotic surgical tool, in accordance with aspects of the subject technology. The surgical robotic arm 112 is configured by design, shape, circuitry, and/or programming to hold and operate the surgical tool 220. As shown in FIG. 2, the example surgical robotic arm 112 may include a plurality of links (e.g., a link 204) and a plurality of actuated joint modules (e.g., a joint 202) for actuating the plurality of links relative to one another. The joint modules may include various types, such as a pitch joint or a roll joint, which may substantially constrain the movement of the adjacent links around certain axes relative to others. Also shown in the exemplary design of FIG. 2 is a tool drive 210 attached to the distal end of the robotic arm 112. The tool drive 210 may include a cannula 214 coupled to its end to receive and guide a surgical instrument 220 (e.g., endoscopes, staplers, grippers, etc.). The surgical instrument (or "tool") 220 may include an end effector 222 at the distal end of the tool. The plurality of the joint modules of the robotic arm 112 can be actuated to position and orient the tool drive 210, which actuates the end effector 222 for robotic surgeries.

Figure 3A:
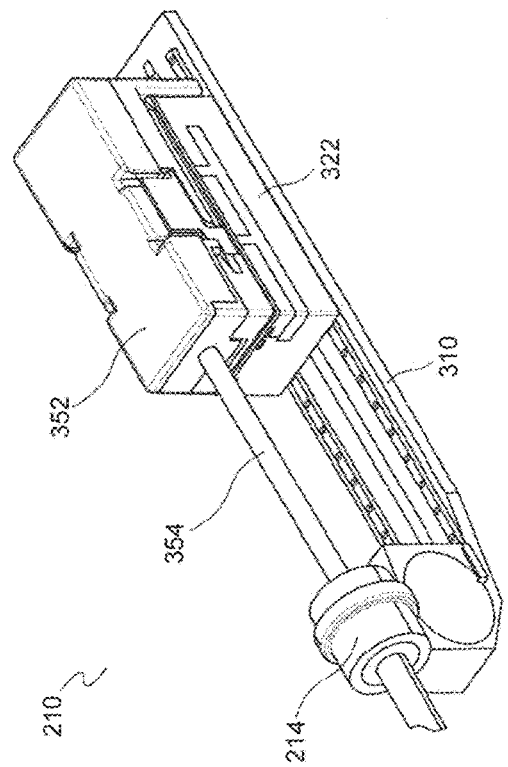
FIGS. 3A and 3B are schematic diagrams illustrating an exemplary tool drive with and without a loaded tool adjacent, respectively, in accordance with aspects of the subject technology.
Figure 3B:
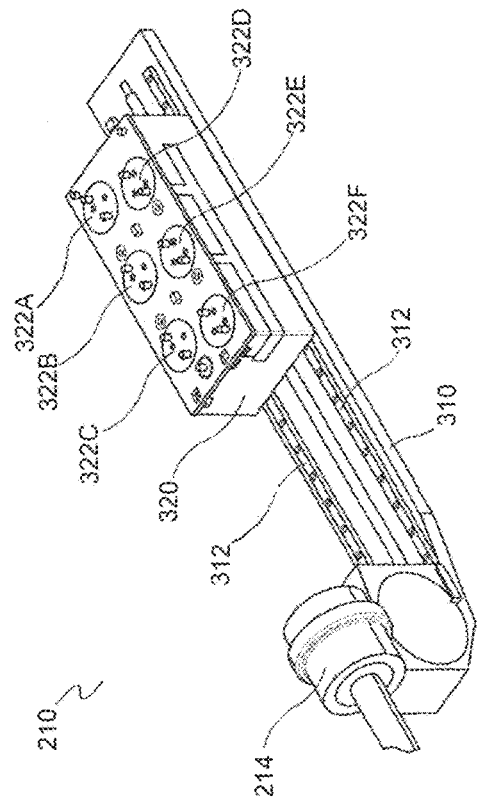

FIGS. 3A and 3B are schematic diagrams illustrating an exemplary tool drive with and without a loaded tool adjacent, respectively, in accordance with aspects of the subject technology. As shown in FIGS. 3A and 3B, in one variation, the tool drive 210 may include an elongated base (or "stage") 310 having longitudinal tracks 312 and a tool carriage 320, which is slidingly engaged with the longitudinal tracks 312. The stage 310 may be configured to couple to the distal end of a robotic arm such that articulation of the robotic arm positions and/or orients the tool drive 210 in space. Additionally, the tool carriage 320 may be configured to receive a tool base 352 of the tool 220, which may also include a tool shaft 354 extending from the tool base 352 and through the cannula 214, with the end effector 222 (not shown) disposed at the distal end.

Additionally, the tool carriage 320 may actuate a set of articulated movements of the end effector, such as through a cable system or wires (the terms "cable" and "wire" are used interchangeably) manipulated and controlled by actuated drives (the terms "actuators," "motors," and "drives" are used interchangeably). The tool carriage 320 may include different configurations of actuated drives. For example, the rotary axis drives may include a motor with a hollow rotor and a planetary gear transmission at least partially disposed within the hollow rotor. The plurality of rotary axis drives may be arranged in any suitable manner. For example, the tool carriage 320 may include six rotary drives 322A-322F arranged in two rows, extending longitudinally along the base that are slightly staggered to reduce width of the carriage and increase the compact nature of the tool drive. As clearly shown in FIGS. 3B, rotary drives 322A, 322B, and 322C may be generally arranged in a first row, while rotary drives 322D, 322E, and 322F may be generally arranged in a second row that is slightly longitudinally offset from the first row.

FIGS. 4A and 4B are schematic diagrams illustrating an end effector of an exemplary grasper having a robotic wrist, a pair of opposing jaws, and a pulley and cable system for coupling the robotic wrist and the pair of jaws to actuators of a tool drive, in accordance with aspects of the subject technology. Note that although the following tool model is described with reference to the exemplary surgical robotic grasper, the proposed anomaly detection may be adapted to any tools that include an end effector coupled to a tool shaft where cables or other drives are used to control the end effector. Similar tools include, but not limited to, graspers, grippers, forceps, needle drivers, retractors, and cautery instruments. Any number of wrist joints, such as one shown in FIGS. 4A and 4B, none, two, or more may be used. Any number of corresponding cables 405 to control the end effector may be used, such as one, two, three, four, or more. In the example of FIGS. 4A and 4B, four cables 405 are used to control three degrees of freedom of the end effector.

As shown in FIG. 4A, the pair of opposing jaws 401A and 401B are movably coupled to a first yoke 402 of the robotic wrist via an extended axle 412 along a first axis 410. The first yoke 402 may be movably coupled to a second yoke 403 of the robotic wrist via a second extended axle 422 along a second axis 420. The pair of jaws 401A and 401B may each be coupled or integrally formed with pulleys 415A and 415B respectively, via the extended axle 412, so that both jaws can rotate about the axis 410. Pulleys 425A, 425B, 425C and 425D are coupled to the extended axle 422 and rotate around the axis 420. The pulleys 425A, 425B, 425C and 425D are arranged into a first set of pulleys 425B and 425C on one side of the yoke 402 and a second set of pulleys 425A and 425D on the other side of the yoke 402. The pulleys 425A and 42C are outer pulleys and the pulleys 425B and 425D are inner pulleys. Similarly, the third set of pulleys 435A, 435B, 435C and 435D are coupled to a third extended axle 432 and rotate around the axis 430, which is parallel to the axis 420.

The grasper 220 can be actuated to move one or both of the jaws 401A and 401B in a variety of ways around the axis 410. For example, the jaws 401A and 401B may open and close relative to each other. The jaws 401A and 401B may also be actuated to rotate together as a pair to provide a yaw motion of the grasper 220. In addition, the first yoke 402, the pulleys 415A and 415B, and the jaws 401A and 401B can rotate about the axis 420 to provide a pitch motion of the grasper 220. These motions of the robotic wrist and/or the jaws of the tool can be effected by controlling four independent cables 405A-405D. As shown in FIG. 4A, cable 405A may start (or terminates) from one side of the pulley 415A and route along pulleys 425A and 435A, and cable 405B is configured to terminate at the other side of the pulleys 415A and route through pulleys 425B and 435B. Similarly, another pair of cables 405C and 405D can be coupled to the jaw 401B. For example, cable 405C extends from one side of the pulley 415B to pulleys 425C and 435C; and cable 405D routes through pulleys 425D and 435D and terminates at the other side of pulley 415B. The third set of pulleys 435A, 435B, 435C and 435D are arranged in such a way as to keep the cables 405A-405D affixing to the second set of pulleys 425A-425D and prevent the cables from slipping or sliding relative to the pulleys 425A-425D.

Controlling the motions of the grasper via four independent cables 405 has several advantages. One advantage may be the reduction of the number of cables that extend from the tool base 352 to the robotic wrist compared to typical on-market designs using six cables 405 (or three cable loops with six cable ends). Less number of cables 405 can reduce the tool size as well as complexity of the wrist assembly, which may benefit minimally-invasive surgical procedures or non-surgical applications. Furthermore, arrangement of four independent cable loops instead of two or three cable loops not only allows independent control of the tension on each cable 405 without the need for pre-tensioning of the cables 405, but also enables variable compliance in the wrist joints and increased sensitivity to external loads. Additionally, it is possible to readjust tension on each cable independently, which can further increase tool performance.

As shown in FIGS. 4A and 4B, the grasper can be actuated to move the jaws 401A and 401B in a variety of ways, such as grasping (e.g., jaws rotating independently about axis 410), yaw (e.g., jaws rotating together about axis 410), and pitch (e.g., jaws rotating about axis 420) (three degrees of freedom) by imparting motion to one or more of the pulleys 415A, 415B, 425A, 425B, 425C, and 425D to thereby impart motion on the first yoke 402 and/or one or both of the jaws 401A and 401B. Cables 405A-405D can be grouped into two antagonistic pairs, that is, when one cable of the antagonistic pair is actuated or tensioned, while the other cable is loosened, the jaw will rotate in one direction. Whereas when only the other cable is tensioned, the jaw will rotate in an opposite direction.

For example, cables 405A and 405B are the first antagonistic pair for moving jaw 401A, and cables 405C and 405D are the second antagonistic pair for controlling jaw 401B. When cable 405A is tensioned (e.g., by at least one of the rotary drives 322a-322) while cable 405B is loosened, jaw 401A closes (moving towards the opposite jaw 401B). On the other hand, when cable 405B is tensioned and cable 405A is loosened, jaw 401A opens (moving away from the opposite jaw 401B). Similarly, when tensioned, cable 405C closes jaw 401B (moving towards the opposite jaw 401A) and cable 405D opens jaw 401B (moving away from the opposite jaw 401A) while the other cable loosens. As another example, grip force between the jaw 401A and jaw 401B can be achieved by continuing to tension both cable 405A and cable 405C (while cable 405B and cable 405D are loosened) after the jaws are closed (touching each other).

In cases when both cables of an antagonistic pair are tensioned at the same time while both cables of the other pair are loosened, the pulley 415A or pulley 415B do not rotate. Instead, the first yoke 402 together with the jaws 401A and 401B are imparted by the pulleys 415A and 415B to pitch about the axis 420. For example, when the pair of cables 405A and 405B are both tensioned simultaneously while the pair of cable 405C and 405D are loosened, the jaws (together with the yoke 402) pitch out of the plane of the paper. Whereas when both cables 405C and 405D are tensioned simultaneously and the pair 405A and 405B are kept loose, the jaws pitch into the plane of the paper.

FIG. 4B is a schematic diagram illustrating example angle definitions for various motions of the grasper 220, in accordance with aspects of the subject technology. The angles are defined in reference to axes 410 and 420, as well as an axis 452 of the first yoke 402 and an axis 453 of the second yoke 403. For example, as shown in FIG. 4B, an angle ($\theta_1$) between axis 452 and the axis 453 may represent the rotation angle of the yoke 402 around axis 420, which may also be defined as the pitch angle ($\theta_{pitch}$) of the grasper 220 (while in FIG. 4A, the axis 452 of the yoke 402 is superimposed over the axis 453 of the yoke 403 because the jaws are staying in the reference position, i.e., no pitch motions). In addition, angles ($\theta_2$) and ($\theta_3$) can represent the angles between each of the jaws 401A and 401B and the axis 452 of the yoke 402 (as the origin), respectively. To differentiate the sides of the axis 452, angles ($\theta_2$) and ($\theta_3$) may take on different signs. For example, angle ($\theta_2$) is negative, and angle ($\theta_3$) is positive, as illustrated in FIG. 4B.

Angular position and grip force of a distal end effector of a robotic surgical instrument is controlled. The control system may include feedback loops involving position, torque, and/or velocity feedback from the actuators and force feedback measured on the four wires, to effect desired position and grip force. Other sensors may be included. In one embodiment, each actuator and corresponding cable of the drive chain includes an encoder or other position sensor to determine a rotational position of the actuator and/or cable and a load sensor (e.g., torque sensor) to determine a load or force on the actuator and/or cable.

In some implementations, the actuator controllers may be running a position plus feedforward current mode. For example, a position controller may drive the distal end effector to the desired angular position in space based on the positional feedback, while a grip force controller provides additional feedforward current based on the grip force measured by load cells on the four wires to achieve the desired grip force between the opposing members or jaws 401A-B.

FIG. 10 shows another embodiment of a surgical robotic system, such as one arranged for bronchoscopy. This embodiment may include a cable-driven or other drive chain from an actuator or driver 1028 to a tool or instrument 1013. The robotically-enabled medical system may be configured in a variety of ways depending on the particular procedure.

FIG. 10 illustrates an embodiment of a cart-based robotically-enabled system 1000 arranged for a diagnostic and/or therapeutic bronchoscopy. During a bronchoscopy, the system 1000 may include a cart 1011 having one or more robotic arms 1012 to deliver a medical instrument, such as a steerable endoscope 1013, which may be a procedure-specific bronchoscope for bronchoscopy, to a natural orifice access point (i.e., the mouth of the patient positioned on a table in the present example) to deliver diagnostic and/or therapeutic tools. As shown, the cart 1011 may be positioned proximate to the patient's upper torso in order to provide access to the access point. Similarly, the robotic arms 1012 may be actuated to position the bronchoscope relative to the access point. The arrangement in FIG. 10 may also be utilized when performing a gastro-intestinal (GI) procedure with a gastroscope, a specialized endoscope for GI procedures.

Once the cart 1011 is properly positioned, the robotic arms 1012 may insert the steerable endoscope 1013 into the patient robotically, manually, or a combination thereof. As shown, the steerable endoscope 1013 may include at least two telescoping parts, such as an inner leader portion and an outer sheath portion, each portion coupled to a separate instrument driver from the set of instrument drivers 1028, each instrument driver coupled to the distal end of an individual robotic arm 1012. This linear arrangement of the instrument drivers 1028, which facilitates coaxially aligning the leader portion with the sheath portion, creates a "virtual rail" 1029 that may be repositioned in space by manipulating the one or more robotic arms 1012 into different angles and/or positions. The virtual rails described herein is not any physical structure of the system but is an arrangement of other structures. Translation of the instrument drivers 1028 along the virtual rail 1029 telescopes the inner leader portion relative to the outer sheath portion or advances or retracts the endoscope 1013 from the patient. The angle of the virtual rail 1029 may be adjusted, translated, and pivoted based on clinical application or physician preference. For example, in bronchoscopy, the angle and position of the virtual rail 1029 as shown represents a compromise between providing physician access to the endoscope 1013 while minimizing friction that results from bending the endoscope 1013 into the patient's mouth.

The endoscope 1013 may be directed down the patient's trachea and lungs after insertion using precise commands from the robotic system until reaching the target destination or operative site. In order to enhance navigation through the patient's lung network and/or reach the desired target, the endoscope 1013 may be manipulated to telescopically extend the inner leader portion from the outer sheath portion to obtain enhanced articulation and greater bend radius. The use of separate instrument drivers 1028 also allows the leader portion and sheath portion to be driven independently of each other.

The system 1000 may also include a movable tower 1030, which may be connected via support cables to the cart 1011 to provide support for controls, electronics, fluidics, optics, sensors, and/or power to the cart 1011. Placing such functionality in the tower 1030 allows for a smaller form factor cart 1011 that may be more easily adjusted and/or re-positioned by an operating physician and his/her staff. Additionally, the division of functionality between the cart/table and the support tower 1030 reduces operating room clutter and facilitates improving clinical workflow. While the cart 11 may be positioned close to the patient, the tower 1030 may be stowed in a remote location to stay out of the way during a procedure.

In support of the robotic systems described above, the tower 1030 may include component(s) of a computer-based control system that stores computer program instructions, for example, within a non-transitory computer-readable storage medium such as a persistent magnetic storage drive, solid state drive, etc. The execution of those instructions, whether the execution occurs in the tower 1030 or the cart 1011, may control the entire system or sub-system(s) thereof. For example, when executed by a processor of the computer system, the instructions may cause the components of the robotics system to actuate the relevant carriages and arm mounts, actuate the robotics arms, and control the medical instruments. For example, in response to receiving the control signal, the motors in the joints of the robotics arms may position the arms into a certain posture.

The tower 1030 may also include a pump, flow meter, valve control, and/or fluid access in order to provide controlled irrigation and aspiration capabilities to the system that may be deployed through the endoscope 1013. The tower 30 may include a voltage and surge protector designed to provide filtered and protected electrical power to the cart 11, thereby avoiding placement of a power transformer and other auxiliary power components in the cart 1011, resulting in a smaller, more moveable cart 1011. The tower 1030 may also include support equipment for the sensors deployed throughout the robotic system 1000. Similarly, the tower 1030 may also include an electronic subsystem for receiving and processing signals received from deployed electromagnetic (EM) sensors. The tower 1030 may also be used to house and position an EM field generator for detection by EM sensors in or on the medical instrument.

The tower 1030 may also include a console 1031 in addition to other consoles available in the rest of the system, e.g., console mounted on top of the cart. The console 1031 may include a user interface and a display screen, such as a touchscreen, for the physician operator. Consoles in the system 1000 are generally designed to provide both robotic controls as well as preoperative and real-time information of the procedure, such as navigational and localization information of the endoscope 13. When the console 1031 is not the only console available to the physician, it may be used by a second operator, such as a nurse, to monitor the health or vitals of the patient and the operation of the system 1000, as well as to provide procedure-specific data, such as navigational and localization information. In other embodiments, the console 1031 is housed in a body that is separate from the tower 1030.

Embodiments of the robotically-enabled medical system may also incorporate the patient's table. Incorporation of the table reduces the amount of capital equipment within the operating room by removing the cart, which allows greater access to the patient. FIG. 11 illustrates an embodiment of such a robotically-enabled system. The system 1136 includes a support structure or column 1137 for supporting platform 1138 (shown as a "table" or "bed") over the floor. Much like in the cart-based systems, the end effectors of the robotic arms 1139 of the system 1136 comprise instrument drivers that are designed to manipulate an elongated medical instrument, such as a bronchoscope. In practice, a C-arm for providing fluoroscopic imaging may be positioned over the patient's upper abdominal area by placing the emitter and detector around the table 38.

The column 1137 may include one or more carriages 1143 shown as ring-shaped in the system 1136, from which the one or more robotic arms 1139 may be based. The carriages 1143 may translate along a vertical column interface that runs the length of the column 1137 to provide different vantage points from which the robotic arms 1139 may be positioned to reach the patient. The carriage(s) 1143 may rotate around the column 1137 using a mechanical motor positioned within the column 1137 to allow the robotic arms 1139 to have access to multiples sides of the table 1138, such as, for example, both sides of the patient. In embodiments with multiple carriages 1143, the carriages 1143 may be individually positioned on the column 1137 and may translate and/or rotate independently of the other carriages. While the carriages 1143 need not surround the column 1137 or even be circular, the ring-shape as shown facilitates rotation of the carriages 1143 around the column 1137 while maintaining structural balance. Rotation and translation of the carriages 1143 allows the system 1136 to align the medical instruments, such as endoscopes and laparoscopes, into different access points on the patient. In other embodiments (not shown), the system 1136 can include a patient table or bed with adjustable arm supports in the form of bars or rails extending alongside it. One or more robotic arms 1139 (e.g., via a shoulder with an elbow joint) can be attached to the adjustable arm supports, which can be vertically adjusted. By providing vertical adjustment, the robotic arms 1139 are advantageously capable of being stowed compactly beneath the patient table or bed, and subsequently raised during a procedure.

The robotic arms 1139 may be mounted on the carriages 1143 through a set of arm mounts 1145 including a series of joints that may individually rotate and/or telescopically extend to provide additional configurability to the robotic arms 1139. Additionally, the arm mounts 1145 may be positioned on the carriages 1143 such that, when the carriages 1143 are appropriately rotated, the arm mounts 1145 may be positioned on either the same side of the table 1138, on opposite sides of the table 1138 (as shown in FIG. 11), or on adjacent sides of the table 1138 (not shown).

The column 1137 structurally provides support for the table 1138, and a path for vertical translation of the carriages 1143. Internally, the column 1137 may be equipped with lead screws for guiding vertical translation of the carriages, and motors to mechanize the translation of the carriages 1143 based the lead screws. The column 1137 may also convey power and control signals to the carriages 1143 and the robotic arms 1139 mounted thereon.

In one embodiment, the robotic surgical system of FIG. 11 is used for laparoscopy. In a laparoscopic procedure, through small incision(s) in the patient's abdominal wall, minimally invasive instruments may be inserted into the patient's anatomy. In some embodiments, the minimally invasive instruments include an elongated rigid member, such as a shaft, which is used to access anatomy within the patient. After inflation of the patient's abdominal cavity, the instruments may be directed to perform surgical or medical tasks, such as grasping, cutting, ablating, suturing, etc. In some embodiments, the instruments can comprise a scope, such as a laparoscope for a viewing task, not necessarily surgical in the sense of operating directly on tissue. FIG. 11 illustrates an embodiment of a robotically-enabled table-based system configured for a laparoscopic procedure. As shown in FIG. 11, the carriages 1143 of the system 1136 may be rotated and vertically adjusted to position pairs of the robotic arms 1139 on opposite sides of the table 1138, such that instrument 1159 may be positioned using the arm mounts 1145 to be passed through minimal incisions on both sides of the patient to reach his/her abdominal cavity. Laparoscopy may then be performed using one or more drivers with the laparoscope as the tool or instrument.

Figure 5:
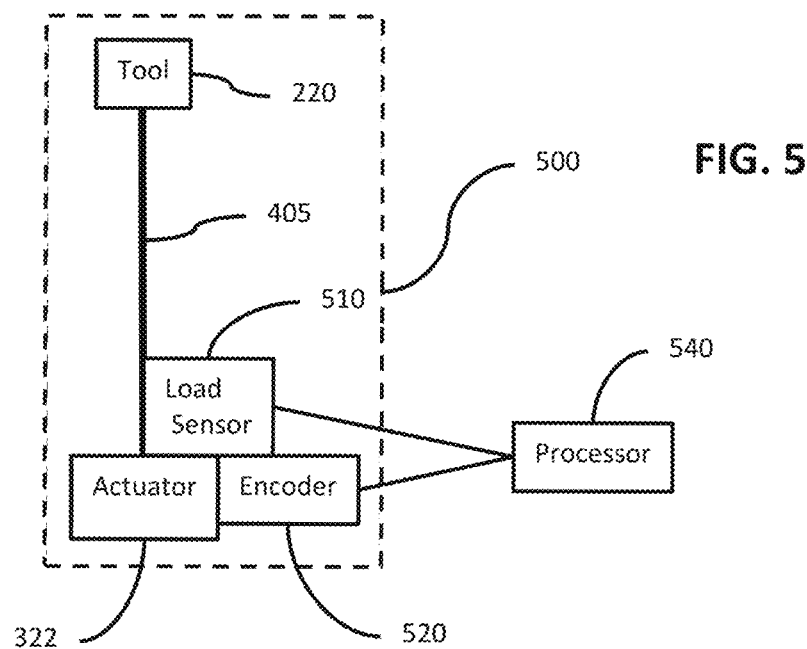
FIG. 5 is a block diagram of an embodiment of a surgical robotic system for machine-learned model-based anomaly detection.

FIG. 5 shows an example surgical robotic system including a processor 540 interacting with a drive chain 500. The drive chain 500 is, for example, the drive chain of FIGS. 3A-4B. Other drive chains using cables, gears, actuators, motors, pulleys, guides, and/or other force transfer devices may be used. The drive chain may be part of a surgical system for manual manipulation or guidance instead of a robotic system for tele-operation, such as a cable driven laparoscopic system. In the example of FIG. 5, one or more cables 405 connects the actuator 322 to the tool 220 for the drive chain 500.

The surgical tool 220 is a grasper with two jaws but may be another type of surgical instrument. The surgical tool 220 connects by a number of cables 405 to a respective number of actuators 322, such as four cables 405 connecting with four engaged actuators 322. The cables 405 allow for actuation of the actuators 322 to move the surgical tool 220, such as opening and closing jaws and/or rotating in pitch and/or yaw.

Sensors 510, 520, such as force sensors (e.g., load cells) and/or position sensors (e.g., encoders for absolute position), are used to control. The processor 540, using instructions in the non-transitory computer readable storage medium, controls operation of the actuators 322 using information from the sensors 510, 520.

The encoder 520 senses a position of the actuator. The encoder 520 may sense an angular position with or without a number of rotations (e.g., 0-360 degrees or 0-N where N is greater than 360 degrees). Linear position may instead be sensed. In one embodiment, the encoder 520 is an absolute position sensor. Other position sensors and/or encoders may be used.

The load sensor 510 is a strain gauge or other sensor for sensing the load or force. The force may be longitudinal and/or rotational. The forces applied by the actuators 322 to the cables 405 and/or tool 220 are sensed. In one embodiment, the load sensor 510 is positioned on an arm of the actuator 322. In another embodiment, the load sensor 510 is positioned on the cable 405. In yet another embodiment, the load sensor 510 is a current sensor to sense the current draw by the actuator 322 to apply force to the cable 405.

Other drive chains with the same or different sensors may be used. For example, only the encoder or another position sensor is provided. As another example, only the load sensor, other torque sensor, and/or other force sensor is provided. In yet other embodiments, a velocity sensor is provided instead of or in addition to the load sensor 510 and/or encoder 520.

The processor 540 is a general processor, application specific integrated circuit, field programmable gate array, digital signal processor, controller, artificial intelligence processor, tensor processor, graphics processing unit, digital circuit, analog circuit, combinations thereof, and/or other now known or later developed processor for robotics control. The processor 540 is configured by software, hardware, and/or firmware to detect an anomaly during teleoperation.

The processor 540 is configured to detect an anomaly in the drive chain 500 by application of a machine-learned model. The machine-learned model is configured to receive past and/or current operation information and output a predicted operation. The processor 540 is configured to detect the anomaly as an output of the machine-learned model (e.g., model trained to output a classification as normal or abnormal) and/or is configured to detect the anomaly by comparing an output of the model to the actual measured operation (e.g., model predicts normal, and abnormal is detected where the measured operation is a threshold difference from the predicted operation).

Various input sources may be used for the model, such as position, load (torque), and/or velocity. The inputs may be for one drive chain 500 (e.g., single cable), for a sub-set of drive chains 500 for a tool 220, or for all of the drive chains 500 for a tool 220. Other inputs may include operational parameters, such as the type of tool 220, the surgery being performed, the time relative to the surgery, and/or a phase of an operation (e.g., suturing). Any combination of inputs may be used.

Various outputs may be generated by the machine-learned model. For example, a cable force, such as load or torque applied to or by the cable 405 is predicted. As another example, a tool position, velocity of the tool 220, and/or torque is output. In yet another example, the output is a classification of anomaly or not, type of anomaly, and/or magnitude of anomaly. A level of uncertainty or certainty in the output by the machine-learned model may be output.

Figure 6:
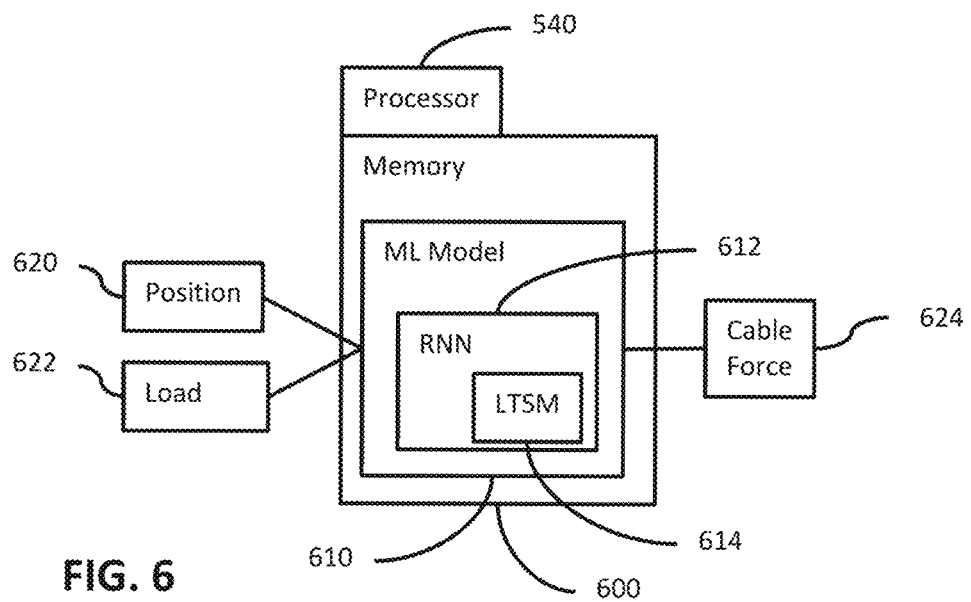
FIG. 6 is a block diagram of another embodiment of a surgical robotic system using a machine-learned model to detect anomalies.

In the example embodiment of FIG. 6, the machine-learned model 610 stored in the memory 600 is configured by training to receive the position 620 and/or load 622 to output a cable force (load) 624. The machine-learned model 610 outputs a predicated cable force in response to receiving or input of the position(s) 620 and the load(s) 622. This example is used herein, but other inputs and/or outputs may be used based on the training data previously used to train the machine-learned model 610.

Any number of past inputs to generate a current output(s) may be used. For example, a sequence of M positions 620 and loads 622 is input to predict a current or next cable force 624. M is an integer of 1 or greater (e.g., M=4, 8, 16, 32, 50, or 64). The sequence is defined by a moving window of M inputs where the window slides over time to select the M most recent inputs. Any number of current and future outputs may be predicted in response to input of a given sequence. For example, N outputs are generated where N is an integer of 1 or greater. Where N=1, the output may be an output (e.g., cable force 624) for a current or next time increment. N=2 or more provides a current or next plus predictions even further in the future.

The current output may be an expected output, such as an expected normal cable force 624. The machine-learned model 610 was trained to output the normal output (e.g., cable force 624). In one embodiment, the processor 540 is configured to detect the anomaly where the normal operation as predicted by the machine-learned model deviates from an actual operation of the surgical tool 220 by the robotic arm 112. The processor 540 is configured to detect the anomaly by comparison of the predicted cable force 624 to an actual cable force sensed at the current or next time by the load sensor 510. Abnormal or classification as normal or not may instead be directly output by the model 610.

The machine-learned model 610 was previously trained using machine learning. Machine learning is an offline training phase where the goal is to identify an optimal set of values of learnable parameters of the model 610 that can be applied to many different inputs (i.e., sequence of actuator positions and/or loads over time). These machine-learned parameters can subsequently be used during operation (testing or application phase) to rapidly predict the operation of the drive chain 500 (e.g., cable force). Once learned, the machine-learned model 610 is used in an online processing phase in which the sequence of measurements is input, and the operation of the drive chain 500 is output based on the model values learned during the training phase.

Various types of machine learning models may be used, such as support vector machines, neural networks, Bayesian, or another. In one embodiment, the model is a neural network, such as a fully connected neural network or a convolutional neural network. Any architecture or layer structure for machine learning may be used. The architecture defines the structure, learnable parameters, and relationships between parameters. In one embodiment, the architecture of the model to be trained and the resulting trained model 610 is a recurrent neural network (RNN) 612. Any of various recurrent neural networks may be used, such as based on one or more long-short-term memories (LSTM) 614. The recurrent neural network 612 may instead be a transformer network.

Figure 7:
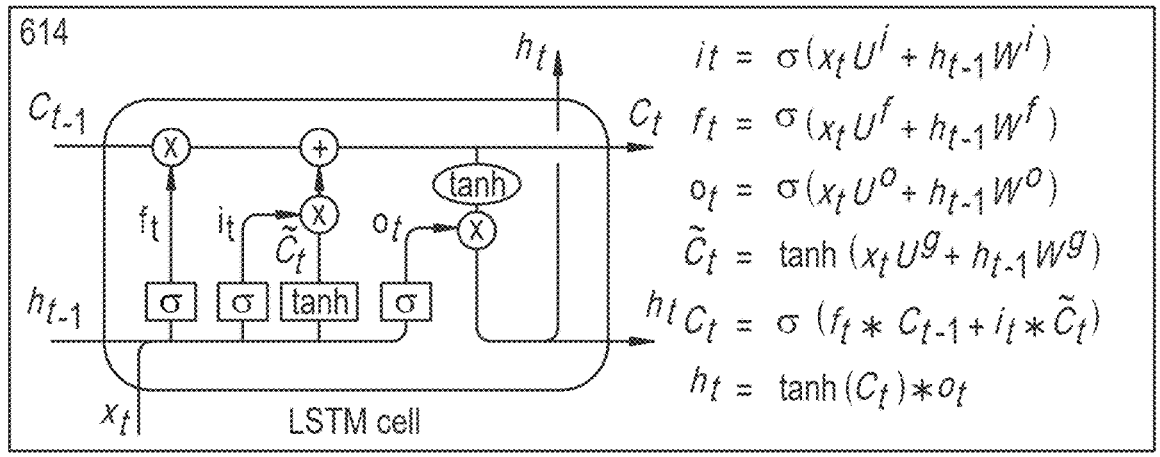
FIG. 7 illustrates an example long-short-term memory (LSTM) cell for a machine-learned model.

FIG. 7 shows an example LSTM 614. LSTM is an artificial RNN architecture used in the field of deep learning. The LSTM defines various weights (e.g., σ) that may be learned. The input x passes through the neural network layers (e.g., σ and tanh), with operators x and + to generate the cell state h where C is an input or output term from other LSTMs 614. T is a temporal index. Other LSTM structures may be used. Transformers may be used instead of LSTM.

Figure 8:
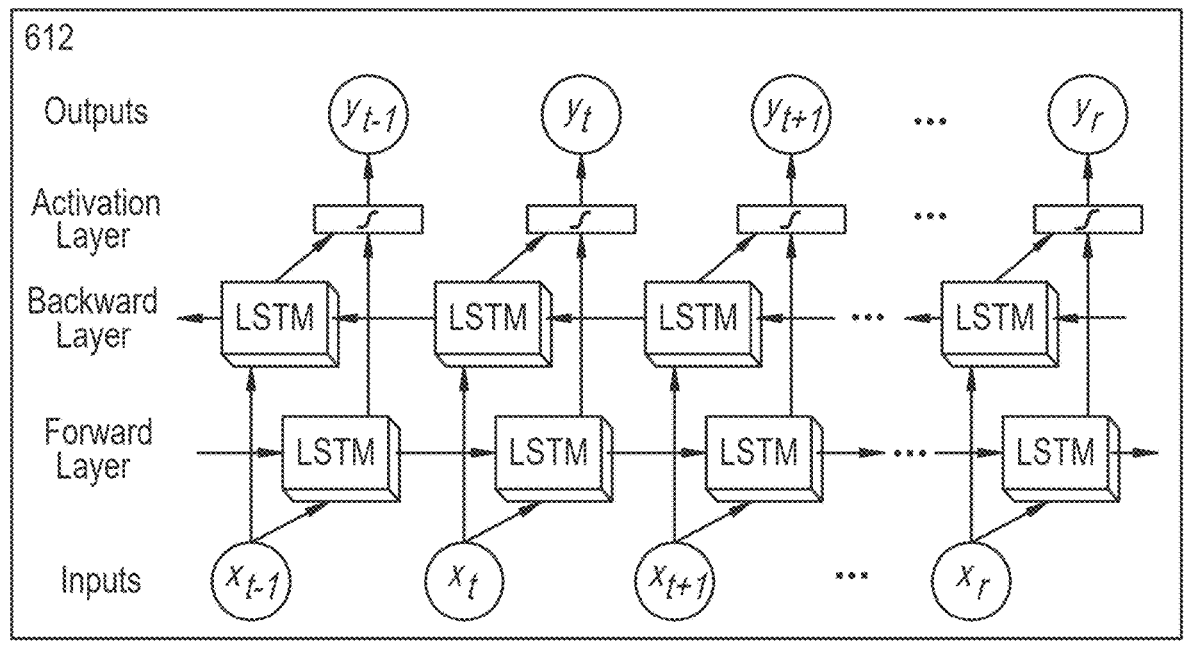
FIG. 8 illustrates an example machine-learned model using LSTMs for anomaly detection.

FIG. 8 shows an example RNN 612. The RNN 612 models time series data. In this example, the dynamics of the drive chain operation is modeled using telemetry data. A sequence of LSTMs 614 is arranged in forward and backward chains or layers. The sequence of inputs x is input to the forward chain and the backward chain or layers. The outputs y are generated from activation layers fed from the LSTMs 614. Other RNNs with different arrangements may be used. Other RNNs without LSTM 614 or transformers may be used. Any number of hidden layers may be provided between the input layer and output layer.

The model 610, such as the recurrent neural network 612, is machine trained. Deep machine training is performed. Deep learning is used to train the model 610. Other machine learning may be used. Many (e.g., hundreds or thousands) samples of inputs to the model and the ground truth outputs are collected as training data. For example, data from testing (e.g., bench or manufacturer testing) is collected as training data. The inputs are measured over time, and the resulting output is measured over time during the testing. Many sample sequences for a given type of surgical instrument 220 and/or drive chain 500 may be collected during failure or other testing of the drive chain 500 and/or surgical instrument 220.

The machine training learns both the features of the input data and the conversion of those features to the desired output. Backpropagation, RMSprop, ADAM, or another optimization is used in learning the values of the learnable parameters of the model 610. Where the training is supervised, the differences (e.g., L1, L2, or mean square error) between the estimated output and the ground truth output are minimized.

Once trained, the model 610 is applied during teleoperation. For example, the machine-learned model 610 is used to predict normal operation. The training data used to train represents normal operation so that the prediction is the output, given the input, which would occur during operation without defects or interference. In alternative embodiments, the machine-learned model 610 was trained for predicting normal and abnormal operation. The model 610 is trained to indicate the current class of operation (e.g., normal or abnormal). In other embodiments, the model is trained to identify when abnormal operation is likely to occur.

The machine-learned model 610 is previously trained, and then used as trained. Fixed values of learned parameters are used for application. The learned values and network architecture determine the output from the input. During application in teleoperation, the same learned weights or values are used. The model and values for the learnable parameters are not changed from one patient to the next, at least over a given time (e.g., weeks, months, or years) or given number of surgeries (e.g., tens or hundreds). These fixed values and corresponding fixed model are applied sequentially and/or by different processors to input sequences for different patients. The model may be updated, such as retrained, or replaced but does not learn new values as part of application for a given patient.

Retraining may be used. For example, the machine-learned model 610 (e.g., RNN 612) is trained using training data from bench testing (i.e., non-patient data). The same surgical instrument and/or type of surgical instrument and robotic arm are then used in teleoperation with patients. The data from the teleoperation with the patients is collected. This second set of data may then be used to retrain. The model 610 starts with the previously learned values for the parameters of the architecture, and then optimization is performed again using the second set or both the original and second sets of data. The result is a retrained model 610 ready for application. One or more values of the learnable parameters may be the same or different due to the retraining.

In another example for retraining, the original training data is based on a type of surgical instrument. The model 610 is trained using the data for that type of surgical instrument. The resulting model 610 as trained may later be retrained using training data from a different type of surgical instrument. The retraining may use both data sets or just the training data for the other type of surgical instrument. By using data in original training or retraining from more than one instrument, the one model 610 may be trained to predict for different types of instruments.

FIG. 9 shows one embodiment of a method for anomaly detection in an instrument 220 of a surgical robotic system. A machine-learned model 610, as trained, is used to rapidly predict operation of the drive chain 500 of a surgical instrument 220. This prediction provides or is used to provide detection of the anomaly.

The method is performed by the surgical robotic system of FIG. 1, 2, or 3A and 3B or another surgical robotic system. In one embodiment, the surgical robotic system of FIGS. 5 and/or 6 performs the method. The method is performed for the surgical instrument of FIGS. 4A and 4B or another instrument. In the example of FIGS. 4A and 4B, four cables 405 control three degrees of freedom for the cable-driven instrument 220. Other numbers of cables 405 with equal or lesser numbers of degrees of freedom of the instrument 220 may be used. A programmed processor 540 (also referred to here as processing logic) of the control unit or other controller performs the method during teleoperation. A non-transitory memory 600 may store instructions for the programmed processor 540 to detect an anomaly.

The acts are performed in the order shown or a different order. For example, acts 900 and 910 are performed simultaneously and/or repetitively. Additional, different, or fewer acts may be provided. For example, act 930 is not provided. As another example, the processor 540 detects the type of surgical instrument 220 connected to the robotic arm 112 and selects the machine-learned model 610 to use for anomaly detection based on the type. In yet another example, acts for connecting the surgical instrument 220 to the robotic arm 112, homing, and/or controlling teleoperation are provided.

Once the tool drive 210 is connected with the tool instrument 220 and any homing, calibration, and/or staging is complete, the robotic arm 122, drive chain 500, and surgical instrument 220 are used in teleoperation while at least part of the surgical instrument 220 is within the patient. The motors (e.g., actuators 322) of the tool drive 210 rotate. The rotation of the motors is performed under position control, but other control modes may be used. The surgeon controls the teleoperation. Input commands from the surgeon are translated into position (or other) control signals for the actuators 322.

In act 900, the processor receives measurements from one or more sensors 510, 520. The sensors 510, 520 measure operation of the drive chain 500 during the teleoperation of the instrument 220 as mounted on the surgical robotic arm 112.

The surgical robotic system operates the cable-driven instrument 220 in surgery. For example, movements of the user interface devices 126 and/or foot pedals 124 are translated into joint commands, such as with inverse kinematics. The actuators 322 are moved and controlled. The cable-driven instrument 220 is moved in surgery. Alternatively, or additionally, the jaws are opened or closed.

Periodically (e.g., every $\frac{1}{10}^{th}$ of a second), one or more sensors 510, 520 sense operation of the drive chain 500. Different sensors 510, 520 may sense at different frequencies.

In one embodiment, the motor or actuator position and load torque are both sensed over time. The sensing is at the actuator 322, along the cable 405, and/or at other parts of the drive chain 500. For example, an encoder 520 senses the position of the actuator 322, and a load sensor 510 senses the load or torque on the actuator 322 and/or the cable 405. Various inputs may be used, such as position as commanded by the user, load resulting from teleoperation, velocity, or any combination thereof. Data (measurements) from the torque sensor (e.g., load sensor 510) alone may be used to detect an anomaly but may be sensitive to a threshold and result in false positives.

In act 910, the processor 540 predicts operation of the drive chain 500 during teleoperation. The prediction is performed, at least in part, by a machine-learned model 610. The machine-learned model 610 rapidly (i.e., with less processing than an algorithm) predicts operation in response to input of the measurements. The machine-learned model 610 was previously trained on the same type of surgical instrument 220, so the measurements from operation of a given surgical instrument 220 may be used to accurately predict operation of that instrument 220. Tools 220 of each type are consistent. For example, friction characteristics remain relatively the same for a given type of instrument 220.

In one embodiment, the prediction is of normal operation. Given the inputs, the machine-learned model 610 predicts operation that would occur without interference or damage along the drive chain 500 (e.g., damage to the actuator 322, cables 405, and/or instrument 220). For example, a sequence of proceeding positions and loads for a given drive chain 500 or for all the drive chains 500 connected to the same instrument 220 are input to the model 610, which outputs a load, torque, or another cable force for a next time increment. The predicted cable force is a prediction as if operation is normal. The dynamics between the input position and/or load and output cable force is modeled through the training, allowing the trained model to predict.

The machine-learned model 610 is a RNN 612, but other neural networks or models may be used. For example, the model 610 is an RNN 612 using one or more LSTMs 614 and/or transformers.

The model 610 was trained based on simulation, bench testing, or both. The training data is collected from testing or simulation rather than use in a patient. Alternatively, the training data is collected from use in a patient. In one embodiment, an initial model 610 is trained and used as trained based on simulation and/or bench testing data. This data is readily available from initial testing of tools during the manufacturing process. Extensive data collected during testing is leveraged to build surrogate models specific to each tool type. The models 610 may then be retrained using data or examples collected during use in patients. A trained model 610 is deployed for each tool type, and these models 610 can be further refined over time as more data is made available. Similarly, the model 610 may have been trained for one type of instrument 220. Data collected from testing and/or use in a patient for a different type of instrument 220 (e.g., original is a clamp and other type is a scalpel) is then used to retrain the model 610 for use with this other type of instrument 220.

The measurements are received in act 900 in an ongoing basis. A moving window of the M most recent measurements defines the measurements for input to the model. For each time increment, the model 600 predicts one or more values for the operation in the future and/or for a current time. Acts 900 and 910 repeat as the temporal window moves to define measurements in a first-in, first-out operation.

In act 920, the processor 540 detects the anomaly. The anomaly may be detected based on the model 610 outputting that an anomaly in the measurements has occurred. In one embodiment, the anomaly is detected using the output. The model 610 outputs normal operation, such as an expected cable force. This expected cable force for normal or unimpeded and undamaged operation is compared to the actual cable force measured for the time increment of the prediction. The comparison of the predicted operation output by the machine-learned model 610 and an actual operation of the drive chain 500 indicates whether an anomaly has occurred. Where the expected and actual are within a threshold difference of each other, then the actual operation is normal. Where the actual deviates from the expected by the threshold amount, then an anomaly has occurred.

Since the machine-learned model 610 was trained using training data for normal operation and/or to detect an anomaly regardless of the source of the anomaly, the anomaly detection operates regardless of which source of anomaly occurs. A deviation from normal may be due to one or more of various problems. Without reliance on detecting the anomaly as being due to a particular one of the various problems, the anomaly is detected. The comparison between predicted output vs actual output can be used to assess unexpected events like cable breakage or obstruction, higher than expected friction in tools 220, and/or unexpected external loading at the wrist. The anomaly is detected regardless of the source. In other embodiments, the model 610 is trained to indicate the type of anomaly, and/or the processor 540 determines the type of anomaly.

The anomaly may be detected based prediction from a given time. Alternatively, the deviations over a window of time (period) of actual from predicted are combined (e.g., summed or averaged) or used together. The anomaly is detected where the comparison for each time exceeds a threshold difference over the period or where the combination exceeds the threshold. For example, the cable force for next 'n' time-steps is predicted for each of the time steps. If cumulative error between the predicted cable force and the actual cable forces for a specified time window is greater than a predefined threshold, a warning is issued to the user.

In act 930, the processor 540 outputs an indication of the detection of the anomaly. The processor 540 outputs to memory, a display, robotic system controller, or a report. The processor 540 generates the indication as text, a warning light, a flag, graphic, or remediation instructions. For example, the user interface displays a warning of anomaly detection so that the user may plan for operation being impeded. As another example, the controller causes the robotic arm 112 and/or surgical instrument 220 to operate differently (e.g., more slowly or with less force) due to detection of the anomaly. In another example, instructions to test, fix, or replace the drive chain 500 and/or instrument 220 are issued.

In an example embodiment, the RNN 612 of FIG. 8 is trained and used. The input training data is normalized and scaled, such as normalizing and scaling torque telemetry and encoder positions. The model is trained using the following hyperparameters: time steps: 50, learning rate: 1e-5, optimizer: ADAM, loss function: mean squared error, batch size: 32, epochs: 500 with early stopping (patience=30), network architecture: 2 layer LSTM with ELU activation and 4 units (see FIG. 8), train-validation split: 0.8/0.2, input: [{enc(t−50), tau(t−50)}, {enc(t−49), tau(t−49)} . . . {enc(t),0}], output: [tau(t)] (where enc is encoder and tau is torque or load), test case: data collected on different tool for 4 scenarios: normal run, failure pitch, failure yaw, and failure jaw. The training data is collected for random motions in articulation degrees of freedom on the full system for runs collected on different tools of the same time. Data is collected at 200 Hz, resulting in 68,331 data points. For preprocessing: torque after homing is subtracted from the data, the torque and encoder positions are normalized, and the normalized data is used for training. The final output is the network output of the model 610 plus the initial torque distribution. Other training values and/or arrangements may be used.

In testing, a normal run results in no anomalies being detected. For pitch failure, anomalies are detected. Cables 1,2 and 5,6 are detected as having erroneous torque distributions over defined time intervals. For yaw failure, anomalies are detected. Cables 1,6 and 2,5 are detected as having erroneous torque distributions over defined time intervals. For jaw failure, anomalies are detected in regions with sharp variation in cable torque. Cables 1,5 and 2,6 are detected as having erroneous torque distributions over defined time intervals. For a tool with a different friction profile, the network generalizes for tool-to-tool friction variations, so no anomalies are detected. With external loading, anomalies are detected. The number of detections is a function of the threshold. Thresholding is done on the error between the predicted output and actual output, not the actual output by itself.

In other embodiments, different sorts of inputs are used. Rather than position, torque, and/or velocity, images are used as inputs. For example, a camera (e.g., endoscope) provides images as feedback to estimate the position of the tool tip relative to the issued command by the actuator and/or user. The model 610 is trained to indicate position and/or generate an image (e.g., use a generative neural network) showing position. The actual verses predicted is compared to identify any anomaly. The error or difference of the estimation from actual could be used to assess if the tool is responding as expected.

The above description of illustrated embodiments of the invention, including what is described below in the Abstract, is not intended to be exhaustive or to limit the invention to the precise forms disclosed. While specific embodiments of, and examples for, the invention are described herein for illustrative purposes, various modifications are possible within the scope of the invention, as those skilled in the relevant art will recognize. These modifications can be made to the invention in light of the above detailed description. The terms used in the following claims should not be construed to limit the invention to the specific embodiments disclosed in the specification. Rather, the scope of the invention is to be determined entirely by the following claims, which are to be construed in accordance with established doctrines of claim interpretation.

What is claimed is:

1. A method for anomaly detection of an instrument of a surgical system, the method comprising:
   receiving measurements from a sensor during tele-operation using the instrument in a patient, the sensor sensing at a drive chain of the instrument;
   predicting, during the tele-operation using the instrument in the patient and based on the measurements received from the sensor, a first operation of the drive chain, the predicting being performed by a machine-learned model in response to input of the measurements;
   detecting, during the tele-operation using the instrument in the patient, the anomaly based on comparison of the predicted first operation output by the machine-learned model and an actual operation of the drive chain;
   outputting an indication of detection of the anomaly; and
   taking corrective action for use of the instrument to address the detected anomaly.

2. The method of claim 1 wherein the predicting comprises predicting the first operation as a normal operation.

3. The method of claim 2 wherein the detecting comprises detecting the anomaly as a deviation from the normal operation without reliance on detecting the anomaly as being due to any particular problem of various possible problems.

4. The method of claim 1 wherein the machine-learned model was trained based on simulation, bench testing, or both simulation and bench testing, and further comprising retraining the machine-learned model based on examples from use in patients.

5. The method of claim 1 wherein the instrument is of a first type, and wherein the machine-learned model was trained for a second type of instrument different than the first type and re-trained for the first type.

6. The method of claim 1 wherein the receiving comprises receiving the measurements as motor position and motor load torque over time for a motor of the drive chain.

7. The method of claim 6 wherein the sensor comprises an encoder configured to measure the motor position and a load sensor configured to measure the load torque.

8. The method of claim 1 wherein the predicting comprises predicting a cable force for a cable of the drive chain for the first operation.

9. The method of claim 1 further comprising repeating the receiving and the predicting over time, and wherein the detecting of the anomaly comprises detecting where the comparison exceeds a threshold difference over a period.

10. The method of claim 1 wherein the predicting comprises predicting with the machine-learned model comprising a recurrent neural network.

11. The method of claim 10 wherein the predicting comprises predicting with the recurrent neural network comprising a long-short-term memory.

12. The method of claim 1 wherein the receiving comprises receiving the measurements from the sensor with the sensor sensing at the drive chain for tele-operation of the instrument as mounted to a robotic arm.

* * * * *